United States Patent
Blanshine

[11] 3,752,411
[45] Aug. 14, 1973

[54] FORAGE HARVESTER
[75] Inventor: Allison W. Blanshine, Lititz, Pa.
[73] Assignee: Sperry Rand Corporation, New Holland, Pa.
[22] Filed: Sept. 7, 1971
[21] Appl. No.: 178,098

[52] U.S. Cl............ 241/189 R, 241/198 R, 241/274
[51] Int. Cl............................................. A01d 55/18
[58] Field of Search ................... 146/107 T, 117 R, 146/118–123; 241/86, 88, 189 R, 198 R, 274, 275

[56] References Cited
UNITED STATES PATENTS
| | | | |
|---|---|---|---|
| 3,566,943 | 3/1971 | Witt | 146/107 |
| 2,991,948 | 7/1961 | Hummelen | 241/88 X |
| 3,040,794 | 6/1962 | Jacobsen et al. | 146/107 |
| 3,095,916 | 7/1963 | Jacobsen | 146/117 R |
| 3,525,375 | 8/1970 | Heising | 146/117 R |
| 2,385,767 | 9/1945 | Wagner | 241/88 X |

FOREIGN PATENTS OR APPLICATIONS
| | | | |
|---|---|---|---|
| 539,524 | 9/1941 | Great Britain | 241/88 |
| 952,827 | 3/1964 | Great Britain | 146/107 |

Primary Examiner—Willie G. Abercrombie
Attorney—John C. Thompson et al.

[57] ABSTRACT

A forage harvester of the type having a cylindrical type cutterhead rotatively mounted in the frame. A curved crop confining member is mounted within the frame and is closely spaced to the cutterhead, the curved member being provided with a plurality of bars which extend generally parallel to the axis of rotation of the cutterhead and cooperate with the knives of the cutterhead to cut and/or abrade any grain which passes between the cutterhead and the curved member.

10 Claims, 2 Drawing Figures

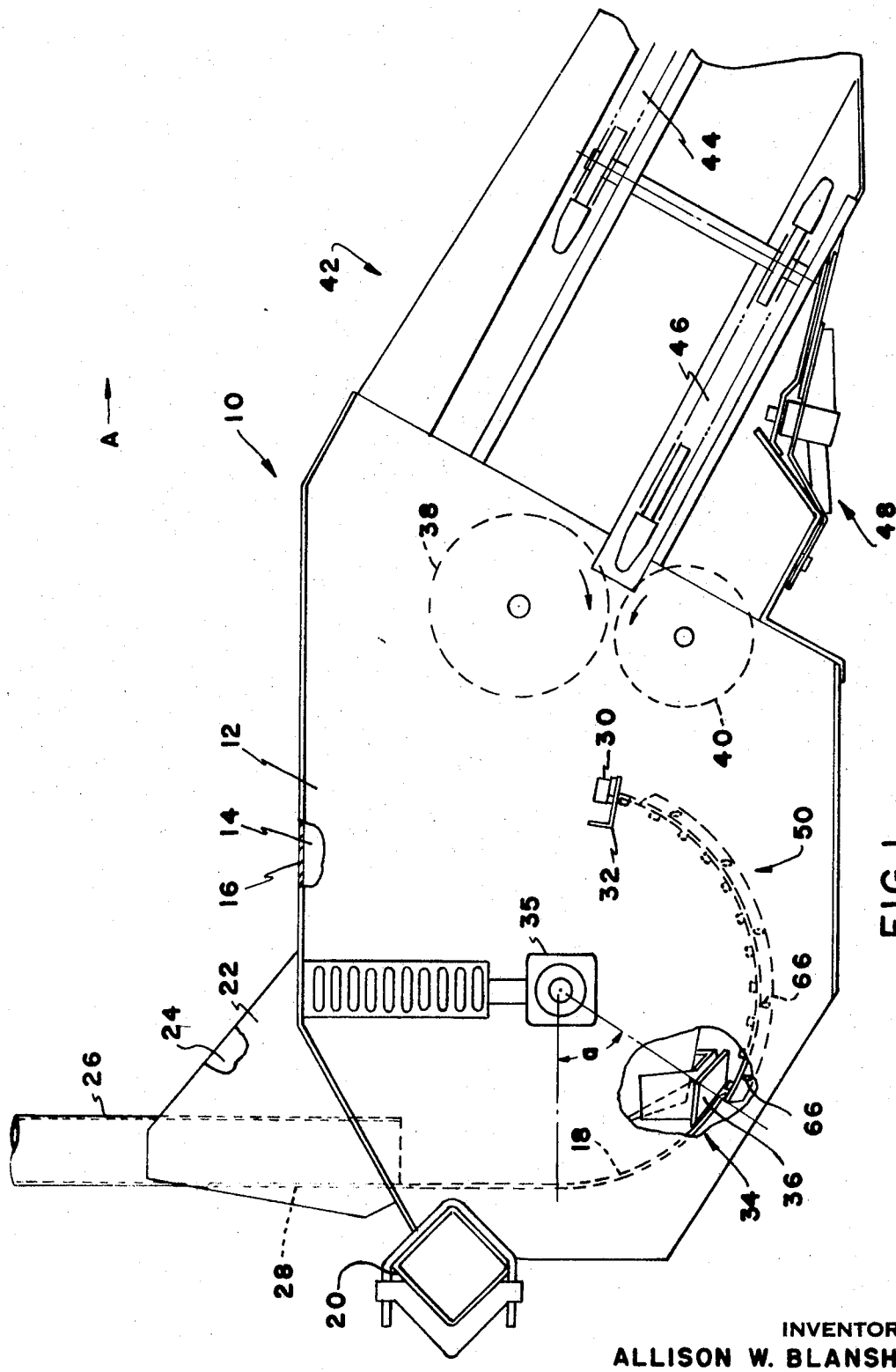

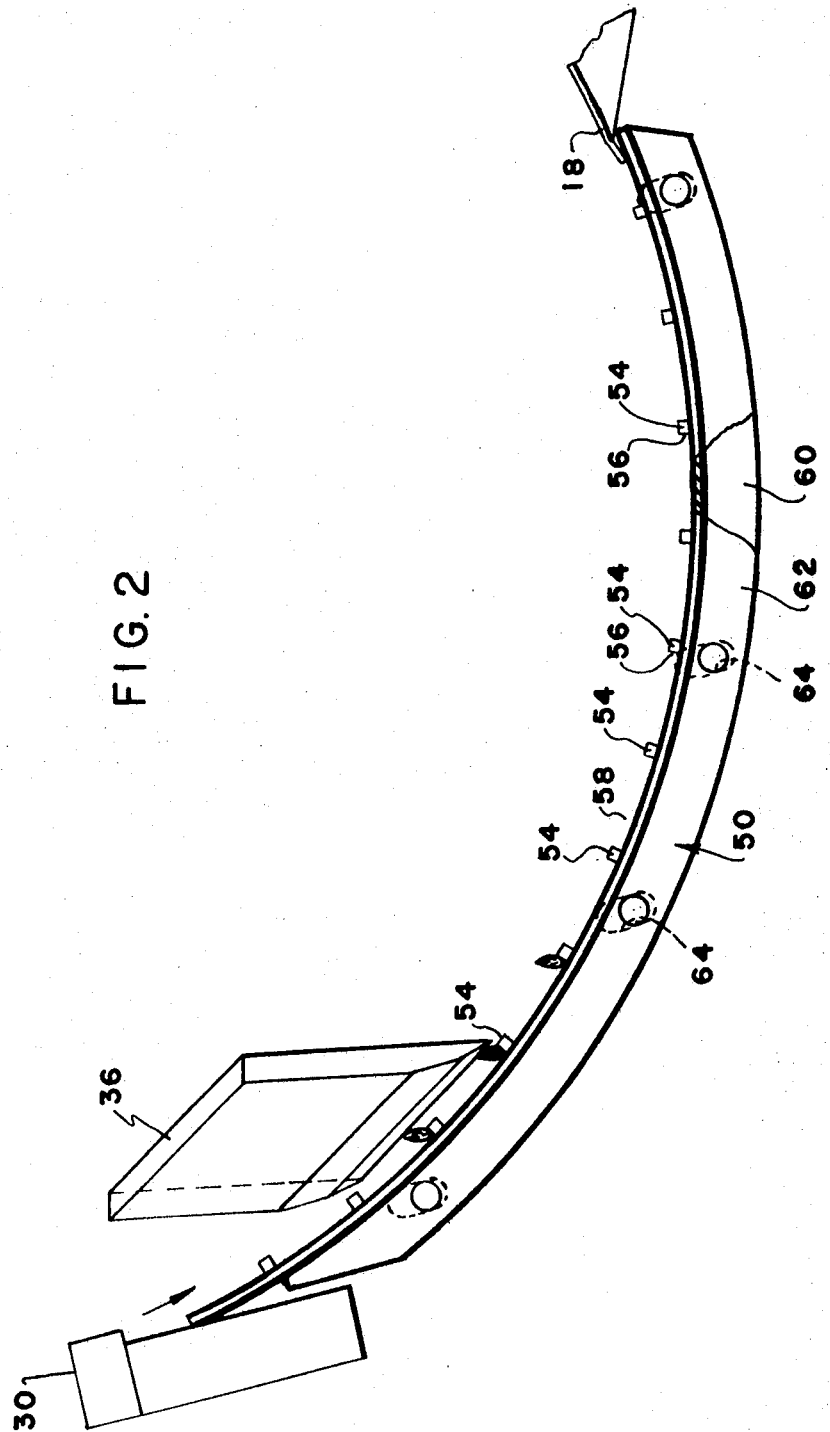

FORAGE HARVESTER

FIELD OF THE INVENTION

The present invention relates generally to forage harvesters and more particularly to forage harvesters of the type having a cylindrical type cutterhead rotatively mounted in a frame, the cutterhead having a plurality of knives which cooperate with a shear bar during rotation of the cutterhead to cut crop material and subsequently propel the cut crop material to a discharge means.

BACKGROUND OF THE INVENTION

Forage harvesters are used to chop or cut crop material into cut forage which is subsequently fed to livestock. One common form of forage harvester utilized for this purpose employs a cylindrical type cutterhead which cooperates with a shear bar to cut any crop material fed past the shear bar. A variety of crops are cut by these harvesters, one of the more important crops being corn. When harvesting corn with a forage harvester of the type having a cylindrical cutterhead generally less than half of the corn kernels are cracked or cut during processing. It has been found that when this chopped corn is subsequently fed to cattle that the cattle may not be able to utilize the full food value of the chopped corn. This is because the digestive system of the cattle is such that they will not digest all of the corn kernels if the outer skin of the kernel has not been cracked or cut. Therefore, it has been necessary in the past when feeding chopped corn to cattle to additionally process the chopped corn before it is fed to the cattle. One system of additionally processing chopped corn utilizes a hammer mill or recutter, and the chopped corn is run through these separate machines after it has been harvested. In another system the forage harvester is provided with a fine screen through which the corn kernels are forced. Both of these systems, while producing a satisfactory end product, have the disadvantage of requiring either additional equipment in the first instance, or requiring considerable power.

OBJECTS AND SUMMARY OF THE INVENTION

It is a principal object of this invention to provide a forage harvester of the type having a cylindrical type cutterhead rotatively mounted within the forage harvester with additional means which cooperate with the cutterhead to crack, cut, and/or abrade a high percentage of corn kernels and other grains which are not easily digested by cattle by providing the forage harvester with a structure that cooperates with the rotatable cutterhead to crack the corn kernels and other grain with a minimal increase in power consumption.

More specifically it is an object of this invention to provide a forage harvester of the type having a cylindrical type cutterhead rotatively mounted on the frame which cooperates with a shear bar to cut the crop material with a curved crop confining member extending away from the shear bar and closely spaced to the periphery of the rotatable cutterhead, the crop confining means being provided with raised portions defining shallow recesses of a depth less than the average thickness of the grain to be abraded, the parts being so arranged and constructed that during rotation of the cutterhead the knives carried by the cutterhead will propel the cut crop material along the curved crop confining member and simultaneously crack, cut and/or abrade the grain in the cut crop in cooperation with the raised portions of the crop confining member.

It is another object of this invention to provide a forage harvester of the type having a cylindrical type cutterhead provided with a plurality of knives that cooperate with a shear bar to cut material and subsequently eject it through a discharge spout with a curved crop confining member disposed adjacent the shear bar and over which cut material is propelled by the knives on the rotatable cutterhead, the curved crop confining member having a plurality of bars which extend parallel to the axis of rotation of the cutterhead, the bars being approximately 3/16th of an inch high and defining between themselves relatively shallow recesses.

These and other objects and advantages of this invention will be apparent to those skilled in the art after a consideration of the following detailed description taken in conjunction with the accompanying drawings, in which the preferred form of this invention is illustrated.

BRIEF DESCRIPTION OF THE DRAWINGS

FIG. 1 is a right side view of a forage harvester in which the principles of the present invention have been incorporated.

FIG. 2 is a detail left side view of the crop confining member which is provided with the grain cracking bars showing the manner in which it is mounted on the forage harvester and also the manner in which the knives of the rotatable cutterhead cooperate with the curved crop confining member to cut, crack and/or abrade the grain after the crop material has been initially cut by the forage harvester.

DETAILED DESCRIPTION OF THE DRAWINGS

The forage harvester of this invention is indicated generally at 10 and is adapted to be propelled in the direction indicated by the arrow A. The frame of the forage harvester includes right and left side sheets 12 and 14, respectively, the side sheets being held apart in fixed spacial relationship to each other by transversely extending members such as a top wall 16 and an intermediate curved portion 18, the top wall and intermediate curved portion being welded or otherwise rigidly secured to the side sheet members 12 and 14. The side sheet members 12 and 14 extend rearwardly past the intermediate curved portion 18 and are notched for the reception of a tool bar 20 which is rigidly secured to the frame of the forage harvester in any conventional fashion. The tool bar is adapted to be mounted on the three point hitch of a conventional farm tractor, not shown. It should be noted at this point that while the forage harvester shown in the drawings is adapted to be secured to a tractor three point hitch, that the forage harvester could in fact be a drawn forage harvester or a self-propelled forage harvester. Extending upwardly from the upper rear portion of the forage harvester are right and left mounting members 22, 24 which carry the discharge spout assembly 26, only a portion being illustrated in the drawings. The discharge spout assembly is generally tubular and has an upper portion which is rearwardly curved for discharge into a trailing wagon. The rear wall 28 of the discharge spout assembly 26 has a lower generally horizontally disposed edge which abuts against an upper horizontally disposed edge of the intermediate curved portion to permit crop material to be thrown upwardly along the intermediate curved portion 18 and the rear wall 28 without interruption of its movement.

A shear bar 30 is mounted on the frame of the forage harvester and extends between and through the right and left side walls 12 and 14. The shear bar 30 is mounted for adjustable movement on mounting brackets 32 which are carried by the right and left side walls (only the right mounting bracket 32 being shown) and the manner of adjustment of the shear bar can be accomplished in any conventional fashion.

A cutterhead, indicated generally at 34, is rotatably mounted between side sheets 12 and 14 by bearing blocks 35 which are secured to the outer sides of the side sheet 12 and 14.

The cylindrical type cutterhead is provided with a plurality of knives 36 which are adapted to pass closely adjacent to the intermediate curved portion 18 during at least 60° of rotation of the cutterhead, as indicated by the angle a, and also closely adjacent to the shear bar 30 to co-act with the shear bar 30 so that during rotation of the cutterhead the knives will cut any crop material being fed past the shear bar and will propel the cut crop material along the intermediate curved portion, accelerating it as it moves so that the material may be thrown upwardly and outwardly through the discharge spout assembly 26.

Also mounted on the frame of the forage harvester are feed means in the form of upper and lower feed rolls 38,40, respectively, the feed rolls receiving crop material from a pickup, indicated generally at 42, mounted on the forward end of the frame of the forage harvester. The pickup 42 illustrated in FIG. 1 is of the type sometimes referred to as a corn head and is provided with upper and lower gathering chains, 44,46, respectively, which engage the stalks of corn growing in a field and convey them upwardly and rearwardly past a sickle assembly, indicated generally at 48, and feed the stalks of corn butt first to the feed rolls 38,40.

While mot illustrated in the drawings, it should be appreciated that means are provided to drive the upper and lower gathering chains 44,46, the sickle assembly 48, the feed rolls 38 nd 40, and the rotatable cutterhead 34.

The forage harvester described so far is generally conventional, however, it should be noted that in conventional forage harvesters the intermediate curved portion 18 will extend from the shear bar under the cutterhead 34 and upwardly and rearwardly to the rear wall 28 of the discharge spout means 26. It is the principal feature of this invention to provide a curved crop confining member, indicated generally at 50, disposed between the shear bar 32 and the lower forward edge of the crop confining portion 18, the curved crop confining member having transversely extending crop engaging portions which cut and/or abrade a portion of the crop material in cooperation with the knives on the rotatable cutterhead. According to the principles of this invention the curved crop confining member 50 includes a curved member 52 (FIG. 2) having the form of a portion of a cylinder, the curved member 52 having mounted on its inner side a plurality of bars 54 which extend transversely to the flow of material across the curved member 52 and to this end they are preferably parallel to the axis of rotation of the cutterhead 34. The bars, as illustrated, are welded to the curved member 52, however, it should be noted that the bars could be secured in any other manner. Similarly, the curved member could be cast with raised portions correpsonding to the bars. If the curved member is cast (forged or made in some other unitary manner) the raised portions should preferably have a forward side 56 which is generally perpendicular to the curved surface 52 or, stated in antoher way, have a forward side extending in a generally radial direction with respect to the cutterhead. The bar 54 are spaced apart from each other and define between themselves shallow recesses 58. Disposed on the radially outer side 59 of the curved member 52 are right and left support members 60,62. The members 60,62 are spaced apart in such a manner that they slide adjacent the inner sides of the right and left side sheets 12,14. Each of the members 60,62 is provided with threaded apertures 64. Bolts (not shown) extend through elongated slots 66 in the side sheets 12 and 14, the bolts being employed to adjustably position the curved confining member within the frame of the forage harvester and also to permit its removal for the substitution of another member which is not provided with bars.

OPERATION

In operation as the forage harvester is propelled forwardly across the field the corn is received by the corn head 42 and is cut and conveyed upwardly and rearwardly by the gathering chains 44,46 to the feed means in the form of rolls 38 and 40. The feed means engage the cut corn stalks and ears and convey them rearwardly over the shear bar 30. As the corn stalks and ears are fed past the shear bar the knives 36 on the rotating cutterhead 34 shear the corn stalks and the corn and propel it rearwardly toward the discharge spout. As the corn kernels have a greater density than the rest of the crop material cut during rotation of the cutterhead the corn kernels will dominate the outer periphery of the mass of crop material being propelled rearwardly by the knives along the crop confining member 50 and the curved portion 18. As the corn passes the bars on the curved crop confining member they will be nicked and/or abraded and/or cut by the knives in cooperation with the bars as the bars tend to retard the progress of the corn kernels along the curved member. This action is best illustrated in FIG. 2. It should be noted that the knives provide a cutting action rather than a mashing action. It has been found in practice that it is desirable to have the bars of a height less than the average thickness of the grain. When processing corn the bars should be approximately 3/16th of an inch high as the kernels will tend to scour the cavities formed between the bars and be cut when their progress is slowed by the bars. If the bars were of greater depth, the greater depth of cavity would accept the more fibroius material and would plug up. However, by making the cavities relatively shallow, i.e., by having the bars extend only 3/16th of an inch inwardly from the inner periphery of the curved member, a proper scouring action is achieved. The curved portion extends approximately 60° of rotation and it has been found that it is important that the bars do not extend all the way towards the discharge spout as this would resist the throwing action imparted by the knives to the crop material, this throwing action eing necessary to properly eject the crop material through the discharge spout. Therefore, the last 60° of movement is free from any obstructions to provide for the proper acceleration of the crop material so it may be thrown through the discharge spout.

It has been found in practice, that up to 99% of the corn kernels can be cut using the curved crop retaining member as shown in the drawings while providing satisfactory blowing of the crop material. Additionally it has been found that there is only a slight increase in power consumption when using the bars.

If hay is to be chopped it may be desirable to replace the curved crop confining member shown in the drawings with one that is smooth, that is, one without the transverse bars.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A forage harvester adapted to cut grain bearing crop and abrade the grain comprising:
   a frame,
   a shear bar mounted on the frame,
   feed means mounted on the frame adjacent the shear bar and capable of receiving crop material and feeding it past the shear bar,
   a cylindrical type cutterhead rotatably mounted on the frame, the cutterhead being provided with a plurality of knife means operable upon rotation of the cutterhead to pass closely adjacent the shear bar and cut any crop material being fed past the shear bar,
   discharge means mounted on the frame through which the cut crop material may be discharged, and
   a curved crop confining member having a continuous impervious surface extending away from the shear bar and closely spaced to the periphery of the rotatable cutterhead, the cut crop material being propelled along the crop confining means during rotation of said cutterhead, said crop confining means being provided with raised portions defining shallow generally smooth recesses of a depth less than the average thickness of the grain to be abraded, said raised portions being spaced apart a distance greater than the average thickness of the grain to be abraded, the parts being so arranged and constructed that during rotation of the cutterhead the knives will (a) cut any crop material being fed past the shear bar, (b) will propel the cut crop material along the curved crop confining member and simultaneously cut and/or abrade the grain in the cut crop in cooperation with said raised portions, and (c) eject the crop through the discharge means after the crop material has moved along the length of the curved crop confining member.

2. The forage harvester set forth in claim 1 in which the side of the raised portions adjacent the shear bar extend generally radially towards the axis of rotation of the cutterhead.

3. The forage harvester set forth in claim 1 in which said raised portions are a plurality of bars.

4. The forage harvester set forth in claim 3 in which said bars extend generally parallel to the axis rotation of said cutterhead.

5. The forage harvester set forth in claim 3 in which said bars have a radial height of approximately 3/16th of an inch.

6. In a forage harvester adapted to cut grain bearing crop and abrade the grain, the forage harvester having
   a frame,
   a shear bar mounted on the frame,
   feed means mounted on the frame adjacent the shear bar and capable of receiving grain bearing crop material and feeding it past the shear bar,
   a discharge spout mounted on the frame,
   a cylindrical type cutterhead rotatably mounted within the frame, the cutterhead being provided with a plurality of knife means operable upon rotation of the cutterhead to pass closely adjacent the shear bar, and
   a curved crop confining member having a continuous impervious generally smooth surface extending away from the shear bar towards said discharge spout,
   the combination therewith of
   a plurality of spaced apart bars mounted on the interior of the curved crop confining member and closely spaced to the periphery of the rotatable cutterhead, each of the bars extending in a direction generally parallel to the axis of rotation of said cutterhead and being spaced apart a distance greater than the average thickness of the grain to be abraded, the parts being so arranged and constructed that during rotation of the cutterhead the knives will (a) cut any crop material being fed past the shear bar, (b) will propel the cut crop material along the curved member and simultaneously cut and/or abrade the grain in the cut crop in cooperation with said plurality of bars, and (c) eject the crop through the discharge spout after the crop material has moved along the length of the curved crop confining member.

7. The forage harvester set forth in claim 6 in which the inner surface of the bars are spaced approximately 3/16th of an inch from the inner surface of the curved member.

8. The forage harvester set forth in claim 6 in which the inner surface of the bars are spaced approximately 1/16th of an inch from the outer radial periphery of the knives.

9. The forage harvester set forth in claim 6 in which the frame is provided with a curved portion which extends at least 60° towards the discharge spout, he crop material being propelled by the rotatable cutterhead over said curved portion towards and through the discharge spout.

10. A forage harvester adapted to be propelled forwardly over a field to cut grain bearing crop material and abrade the grain comprising:
    a frame including a pair of longitudinally extending spaced apart side sheets and an intermediate curved portion spaced between said side sheets,
    a discharge spout mounted on the frame and extending upwardly from one end of the curved portion,
    a cutterhead rotatably mounted within said side sheets, said cutterhead being provided with a plurality of knife means adapted to pass closely adjacent to the curved portion during at least 60° of rotation,
    a shear bar mounted on the frame and spaced closely adjacent the outer radial periphery of the knives, feed means mounted on the frame adjacent the shear bar and capable of receiving crop material and feeding it past the shear bar, and a curved crop confining member having a continuous impervious surface removably mounted between the side sheets and extending away from the shear bar and closely spaced to the outer radial periphery of the knives on the rotatably cutterhead, the cut crop material being propelled along the curved crop confining member during rotation of said cutterhead, said curved crop confining member being provided with a plurality of bars mounted on the interior of the curved member and closely spaced to the periphery of the rotatable cutterhead, said bars defining shallow generally smooth recesses of a depth less than the average thickness of the grain to be abraded and said bars being spaced apart a distance greater than the average thickness of the grain to be abraded, the parts being so arranged and constructed that during rotation of the cutterhead the knives will cut any crop material being fed past the shear bar, will propel the cut crop material along the curved member and simultaneously cut and/or abrade the grain in the cut crop in cooperation with said plurality of bars, and eject the cut and abraded crop material through the discharge spout after the crop material has moved along the length of the curved crop confining member.

* * * * *